United States Patent
Tian et al.

(10) Patent No.: US 11,180,687 B2
(45) Date of Patent: Nov. 23, 2021

(54) ANHYDROUS HEAT TRANSFER MEDIUM AND APPLICATION THEREOF

(71) Applicant: CAC SHANGHAI INTERNATIONAL TRADING CO., LTD, Shanghai (CN)

(72) Inventors: Xiaohong Tian, Shanghai (CN); Simian Xie, Shanghai (CN); Xiaori Yue, Shanghai (CN); Shenglin Li, Shanghai (CN)

(73) Assignee: CAC SHANGHAI INTERNATIONAL TRADING CO., LTD.

( * ) Notice: Subject to any disclaimer, the term of this patent is extended or adjusted under 35 U.S.C. 154(b) by 238 days.

(21) Appl. No.: 16/476,464

(22) PCT Filed: Oct. 23, 2018

(86) PCT No.: PCT/CN2018/111345
§ 371 (c)(1),
(2) Date: Jul. 8, 2019

(87) PCT Pub. No.: WO2019/042482
PCT Pub. Date: Mar. 7, 2019

(65) Prior Publication Data
US 2020/0056080 A1    Feb. 20, 2020

(51) Int. Cl.
*C09K 5/04* (2006.01)
*F28F 23/00* (2006.01)

(52) U.S. Cl.
CPC .............. *C09K 5/048* (2013.01); *F28F 23/00* (2013.01)

(58) Field of Classification Search
None
See application file for complete search history.

(56) References Cited

U.S. PATENT DOCUMENTS

| 7,094,936 B1 | 8/2006 | Owens et al. |
| 8,846,754 B2 * | 9/2014 | Hulse ................. C08J 9/125 |
| | | 514/475 |
| 2005/0126756 A1 * | 6/2005 | Costello ............... F28F 23/00 |
| | | 165/80.4 |

(Continued)

FOREIGN PATENT DOCUMENTS

| CN | 102532582 A | 7/2012 |
| CN | 103228757 A | 7/2013 |

(Continued)

OTHER PUBLICATIONS

Li Haitao et al. "An Experimental Study of Duel Fluid Effect on Heat Transfer Performance of Pulsating Heat", Dec. 31, 2015.

(Continued)

*Primary Examiner* — Joseph D Anthony
(74) *Attorney, Agent, or Firm* — Barnes & Thornburg LLP; Jeffrey R. Stone

(57) ABSTRACT

An anhydrous heat transfer medium, comprising any one or a combination of at least two of cis-1-chloro-3,3,3-trifluoropropene, cis-1,1,1,4,4,4-hexafluorobutene or perfluorobutane methyl ether. The heat transfer medium does not require an external device to perform work on the heat transfer medium during a heat transfer process, and is anhydrous, non-combustible, non-conductive and environmentally friendly.

14 Claims, 2 Drawing Sheets

(56) References Cited

U.S. PATENT DOCUMENTS

2012/0104307 A1* 5/2012 Bogdan .............. C08G 18/3206
                                                           252/62
2018/0043199 A1* 2/2018 Robin ................ C23G 5/02809
2019/0194567 A1* 6/2019 Shono .................... C09K 5/045

FOREIGN PATENT DOCUMENTS

| CN | 105273218 A | 1/2016 |
| EP | 2447310 A2 | 5/2012 |
| WO | 2016112363 A1 | 7/2016 |
| WO | 2016/140398 | 9/2016 |

OTHER PUBLICATIONS

International Search Report, dated Jan. 15, 2019, for PCT Application No. PCT/CN2018/111345.

* cited by examiner

ANHYDROUS HEAT TRANSFER MEDIUM AND APPLICATION THEREOF

TECHNICAL FIELD

This invention belongs to the field of heat conductive materials and relates to a heat transfer medium, such as a novel anhydrous heat transfer medium.

BACKGROUND ART

The continued developments of electronic devices and computers that use high-speed, high density, very-large-scale-integrated (VLSI) circuits create imperative needs for effective heat removal for such devices and computers. Although an isolated chip dissipating 100 W could be cooled by forced air convection, an array of such chips presents a far more difficult cooling problem because of the enormous size of high-performance forced-air heat exchangers. Liquid cooling promises to be a more compact arrangement which can be used in a small VLSI circuits board or in a larger computer system or in electric cars. U.S. Pat. Nos. 4,781,244 and 4,854,377 described a liquid cooling system to remove heat from integrated circuit chips.

Chlorofluorocarbons (CFCs), as a traditional heat transfer medium, have a destructive effect on the Earth's ozone layer and have therefore been phased out. Hydrochlorofluorocarbons (HCFCs) and hydrofluorocarbons (HFCs), which are alternatives, have lower or no ozone depletion potential (ODP), but have been found to contribute to global warming. In addition, due to high ODP, HCFC will eventually reach the phase-out deadline set by the Montreal Protocol. As regulations based on global warming potential become effective, even HFCs with zero ODP will become environmentally unacceptable working fluids.

DISCLOSURE OF THE INVENTION

The invention provides a novel anhydrous, non-flammable, non-electrically-conductive and environmentally-friendly heat transfer medium. In the case of leakage, it does not damage or short circuit the electronic devices. According to this invention, this heat transfer medium has 0 or near 0 ODP (Ozone Depletion Potential) and less than 500 GWP (Global Warming Potential).

To achieve this, the present invention employs the following technical solutions:

The invention provides a novel anhydrous heat transfer medium; this novel heat transfer medium can work in heat transfer process without applying any external work, and the heat transfer medium has an ozone depletion potential of less than 0.01 and a global warming potential of less than 500.

Wherein this novel heat transfer medium can work in heat transfer process without use of any external work, that is, the heat transfer medium is applied to a heat transfer or heat removal element having natural convection and thermo siphon phenomenon. The heat transfer element realizes heat transfer process without "Doing work", unlike the element or equipment such as a heat pump or a refrigeration system that requires the compressor to work on the system to achieve heat transfer.

FIG. 1 is a sketch of a heat transfer or heat removal element where natural convection and thermosiphon phenomenon occurs. The working principle of the medium provided by the invention in the heat transfer or heat removal element is: absorbing the heat from the heat source, the heat transfer medium in the container partially or completely evaporates, and the high temperature and low density vapor tends to rise, and then go through the insulation pipe on top of the container. The vapor enters another heat transfer medium container, which is of lower temperature and contacts with the external environment. The vapor releases its heat to the environment, condenses and then joins the heat transfer medium at the bottom of the container. The bottoms of the two containers are also connected by an insulated pipe to form a circulation of heat transfer medium.

According to the structure shown in FIGS. 2 and 3, the heat transfer or heat removal element of the natural convection and thermosiphon phenomenon can be simplified, that is, the two containers are combined into one container. The space in the container is divided into two sides by an insulation board with openings at upper and lower ends. One side is connected to the heat source, and the other side is connected to the external environment. The structure shown in FIGS. 2 and 3 can also achieve heat transfer medium circulation. Since there are no insulation pipes or external equipment, the space occupied by the element can be greatly reduced. The heat transfer or heat removal element can be used in small or microelectronic devices such as computers, cell phones or smart watches.

It can be seen from the above principle that the heat transfer medium provided by the present invention can achieve the purpose of heat transfer or heat removal without applying any external work inside the heat transfer and heat removal element.

As a preferred embodiment of the present invention, the heat transfer medium comprises cis-1-chloro-3,3,3-trifluoropropene, cis-1,1,1,4,4,4-hexafluorobutene or perfluorobutane methyl ether or a combination of at least two of them. Typical but non-limiting example combination is: cis-1-chloro-3,3,3-trifluoropropene and cis-1,1,1,4,4,4-hexafluorobutene, cis-1,1,1,4,4,4-hexafluorobutene and perfluorobutane methyl ether, perfluorobutane methyl ether and cis-1-chloro-3,3,3-trifluoropropene or cis-1-chloro-3,3,3-trifluoropropene, cis-1,1,1,4,4,4-hexafluorobutene and perfluorobutane methyl ether.

Preferably, the mass fraction of cis-1-chloro-3,3,3-trifluoropropene in the heat transfer medium is from 1 to 99%, such as 1%, 2%, 5%, 8%, 10%, 15%, 20%, 25%, 30%, 40%, 50%, 60%, 70%, 80%, 90%, 92%, 95%, 98% or 99%, etc. Not limited to the listed values, other unlisted values within this range are also applicable.

As a preferred embodiment of the present invention, the composition of the heat transfer medium comprises cis-1-chloro-3,3,3-trifluoropropene and cis-1,1,1,4,4,4-hexafluorobutene.

As a preferred embodiment of the present invention, the mass fraction of cis-1-chloro-3,3,3-trifluoropropene is 70-95%, such as 70%, 72%, 75%, 78%, 80%. 82%, 85%, 88%, 90%, 92% or 95%, etc. Not limited to the listed values, other unlisted values within this range are also applicable, preferably 75 to 90%.

Preferably, cis-1,1,1,4,4,4-hexafluorobutene has a mass fraction of 5 to 30%, such as 5%, 8%, 10%, 12%, 15%, 18%, 20%, 22%, 25%, 28% or 30%, etc. Not limited to the listed values, other unlisted values within this range are also applicable, preferably 10 to 25%.

As a preferred embodiment of the present invention, the composition of the heat transfer medium includes cis-1-chloro-3,3,3-trifluoropropene and perfluorobutane methyl ether.

As a preferred embodiment of the present invention, the mass fraction of cis-1-chloro-3,3,3-trifluoropropene is 10 to 90%, such as 10%, 15%, 20%, 25%, 30%, 35%, 40%, 45%, 50%, 55%, 60%, 65%, 70%, 75%, 80%, 85% or 90%, etc. Not limited to the listed values, other unlisted values within this range are also applicable, preferably 50 to 70%.

Preferably, the perfluorobutane methyl ether has a mass fraction of 10 to 90%, such as 10%, 15%, 20%, 25%, 30%, 35%, 40%, 45%, 50%, 55%, 60%, 65%, 70%, 75%, 80%, 85% or 90%, etc. Not limited to the listed values, other unlisted values within this range are also applicable, preferably 30 to 50%.

As a preferred embodiment of the present invention, the composition of the heat transfer medium comprises cis-1-chloro-3,3,3-trifluoropropene, cis-1,1,1,4,4,4-hexafluorobutene and perfluorobutane methyl ether.

As a preferred embodiment of the present invention, the mass fraction of cis-1-chloro-3,3,3-trifluoropropene is 60-90%, such as 60%, 62%, 65%, 68%, 70%, 72%, 75%, 78%, 80%, 82%, 85%, 88% or 90%, etc. Not limited to the listed values, other unlisted values within this range are also applicable.

Preferably, cis-1,1,1,4,4,4-hexafluorobutene has a mass fraction of 5 to 10%, such as 5%, 6%, 7%, 8%, 9% or 10%, etc. Not limited to the listed values, other unlisted values within this range are also applicable.

Preferably, perfluorobutane methyl ether has a mass fraction of 5 to 30%, such as 5%, 8%, 10%, 12%, 15%, 18%, 20%, 22%, 25%, 28% or 30%, etc. Not limited to the listed values, other unlisted values within this range are also applicable.

As a preferred embodiment of the present invention, the composition of the heat transfer medium includes perfluorobutane methyl ether and cis-1,1,1,4,4,4-hexafluorobutene.

Preferably, perfluorobutane methyl ether has a mass fraction of 10 to 90%, such as 10%, 15%, 20%, 25%, 30%, 35%, 40%, 45%, 50%, 55%, 60%, 65%, 70%, 75%, 80%, 85% or 90%, etc. Not limited to the listed values, other unlisted values within this range are also applicable.

Preferably, the mass fraction of cis-1,1,1,4,4,4-hexafluorobutene is 10 to 90%, such as 10%, 15%, 20%, 25%, 30%, 35%, 40%, 45%, 50%, 55%, 60%, 65%, 70%, 75%, 80%, 85% or 90%, etc. Not limited to the listed values, other unlisted values within this range are also applicable.

Another object of the present invention is to provide an application of the above-described heat transfer medium for a very large scale integrated (VLSI) circuit board, a large computer system, an electric vehicle, a high speed train, a satellite or a space station.

Compared with the related technologies in the field, the present invention has at least the following advantages:

(1) The present invention provides a novel heat transfer medium, of which the evaporation and condensation process is spontaneous without applying external work in heat transfer or heat removal elements of natural convection and thermosiphon phenomena;

(2) The present invention provides a novel heat transfer medium which is anhydrous, non-flammable, non-electrically-conductive, and environmentally friendly;

(3) The present invention provides a novel heat transfer medium that, in the case of a leak, does not damage or short-circuit the electronic device;

(4) The present invention provides a novel heat transfer medium having an ozone depletion potential (ODP) of less than 0.01 and a global warming potential (GWP) of less than 500.

DESCRIPTION OF REFERENCE NUMBERS: 1 is heat transfer medium, 2 is heat source, 3 is insulation pipe, 4 is evaporation surface, 5 is condensation surface, 6 is insulation board, 7 is heat transfer medium vapor, 8 is heat transfer medium condensate.

Embodiments

Figure 1:
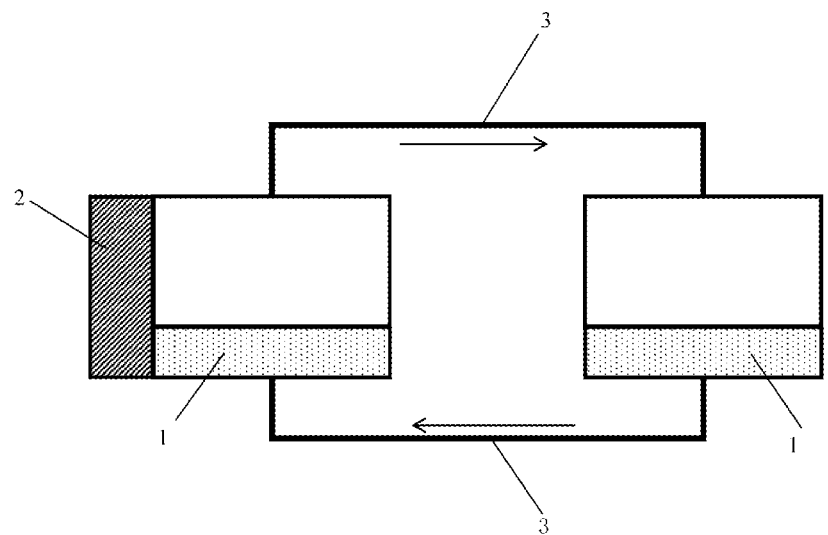
FIG. 1 is a schematic structural view of a heat transfer or heat removal element of the natural convection and thermosiphon phenomenon of the present invention.
Figure 2:
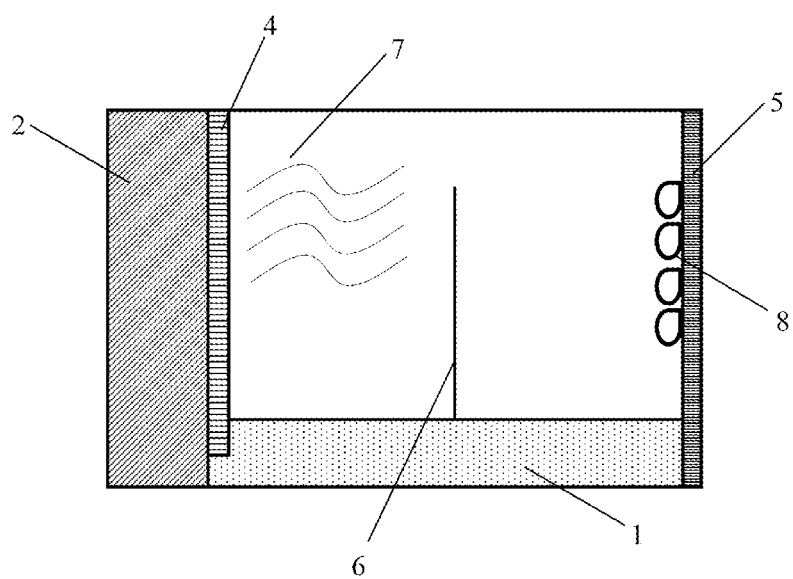
FIG. 2 is a schematic view showing the working principle of a novel heat transfer medium provided in a heat transfer or heat removal element according to the present invention.
Figure 3:
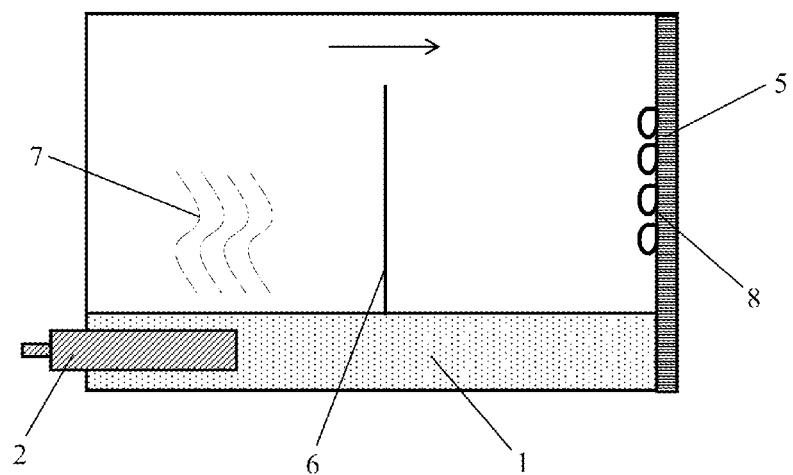
FIG. 3 is a schematic view showing the working principle of a novel heat transfer medium provided in another heat transfer or heat removal element.

In order to better explain and understand the embodiment of the present invention, a typical but non-limited embodiment of the present invention is as follows:

Test method: A 2 liter heat transfer or heat removal element as shown in FIG. 2 was evacuated, and then 1 kg of the heat transfer medium provided by the present invention was added. 1 KW of heat is absorbed through 25 $cm^2$ area at 70° C. to evaporate cis-1-chloro-3,3,3-trifluoro propene or cis-1,1,1,4,4,4-hexafluorobutene or perfluoro-butane methyl ether, respectively. A mass flow meter is used to measure the vapor rate. A pressure gage is used to measure the system pressure. An air-cooled condenser is used to condense the vapor. Once the system is reached at steady state conditions, the pressure and vapor rate is recorded;

EXAMPLES 1-3

In Examples 1-3, cis-1-chloro-3,3,3-trifluoropropene, cis-1,1,1,4,4,4-hexafluorobutene and perfluorobutane methyl ether were used as a heat transfer medium respectively, and the pressure and vapor rate during the heat transfer process were measured according to the above test method. The results are shown in Table 1.

TABLE 1

| Example | Temperature (° C.) | Pressure (KPa) | Vapor rate (kg/min) | GWP | Boiling point (° C.) | Evaporation heat (kJ/kg) |
|---|---|---|---|---|---|---|
| 1 | 70 | 282 | 0.3 | <1 | 39 | 213 |
| 2 | 70 | 336 | 0.39 | 2 | 33 | 166 |
| 3 | 70 | 141 | 0.52 | 320 | 61 | 125 |

EXAMPLES 4-8

Examples 4-8 used a mixture of perfluorobutane methyl ether and cis-1-chloro-3,3,3-trifluoropropene as the heat transfer medium. The various mass fractions of cis-1-chloro-3,3,3-trifluoropropene and perfluorobutane methyl ether in each example are shown in Table 2. The pressure and vapor rate during the heat transfer process were measured according to the above test method, and the results are shown in Table 3.

TABLE 2

| Example | 4 | 5 | 6 | 7 | 8 |
|---|---|---|---|---|---|
| cis-1-chloro-3,3,3-trifluoropropene | 10% | 30% | 50% | 70% | 90% |
| perfluorobutane methyl ether | 90% | 70% | 50% | 30% | 10% |

TABLE 3

| Example | Temperature (° C.) | Pressure (KPa) | Vapor rate (kg/min) | GWP | Boiling point (° C.) | Evaporation heat (kJ/kg) |
|---|---|---|---|---|---|---|
| 4 | 70 | 171 | 0.47 | 288 | 53.6 | 147 |
| 5 | 70 | 214 | 0.4 | 224 | 46.4 | 178 |
| 6 | 70 | 242 | 0.36 | 160 | 42.6 | 210 |
| 7 | 70 | 262 | 0.33 | 96 | 40.2 | 203 |
| 8 | 70 | 276 | 0.31 | 32 | 38.6 | 210 |

EXAMPLES 9-13

A mixture of cis-1-chloro-3,3,3-trifluoropropene and cis-1,1,1,4,4,4-hexafluorobutene is used as a heat transfer medium. The various mass fractions of cis-1-chloro-3,3,3-trifluoropropene and cis-1,1,1,4,4,4-hexafluorobutene are shown in Table 4. The pressure and vapor rate during the heat transfer process were measured according to the above test method, and the results are shown in Table 5.

TABLE 4

| Example | 9 | 10 | 11 | 12 | 13 |
|---|---|---|---|---|---|
| cis-1-chloro-3,3,3-trifluoropropene | 70% | 75% | 85% | 90% | 95% |
| cis-1,1,1,4,4,4-hexafluorobutene | 30% | 25% | 15% | 10% | 5% |

TABLE 5

| Example | Temperature (° C.) | Pressure (KPa) | Vapor rate (kg/min) | GWP | Boiling point (° C.) | Evaporation heat (kJ/kg) |
|---|---|---|---|---|---|---|
| 9 | 70 | 300 | 0.33 | 1 | 36 | 198 |
| 10 | 70 | 297 | 0.32 | 1 | 37 | 201 |
| 11 | 70 | 291 | 0.32 | 1 | 37 | 206 |
| 12 | 70 | 288 | 0.31 | 1 | 37 | 208 |
| 13 | 70 | 285 | 0.31 | <1 | 38 | 211 |

EXAMPLES 14-18

Examples 14-18 used a mixture of perfluorobutane methyl ether and cis-1,1,1,4,4,4-hexafluorobutene as a heat transfer medium. The various mass fractions of perfluorobutane methyl ether and cis-1,1,1,4,4,4-hexafluorobutene in each example are shown in Table 6. The pressure and vapor rate during the heat transfer process were measured according to the above test method, and the results are shown in Table 7.

TABLE 6

| Example | 14 | 15 | 16 | 17 | 18 |
|---|---|---|---|---|---|
| perfluorobutane methyl ether | 10% | 30% | 50% | 70% | 90% |
| cis-1,1,1,4,4,4-hexafluorobutene | 90% | 70% | 50% | 30% | 10% |

TABLE 7

| Example | Temperature (° C.) | Pressure (KPa) | Vapor rate (kg/min) | GWP | Boiling point (° C.) | Evaporation heat (kJ/kg) |
|---|---|---|---|---|---|---|
| 14 | 70 | 322 | 0.40 | 34 | 34 | 167 |
| 15 | 70 | 292 | 0.41 | 97 | 37 | 161 |
| 16 | 70 | 258 | 0.43 | 161 | 41 | 154 |
| 17 | 70 | 217 | 0.45 | 225 | 46 | 143 |
| 18 | 70 | 169 | 0.49 | 288 | 54 | 128 |

EXAMPLES 19-23

Examples 19-23 used cis-1-chloro-3,3,3-trifluoropropene, cis-1,1,1,4,4,4-hexafluorobutene and perfluorobutane methyl ether mixture as a heat transfer medium. The various mass fractions of cis-1-chloro-3,3,3-trifluoropropene, cis-1,1,1,4,4,4-hexafluorobutene and perfluorobutane methyl ether in each example are shown in Table 8. The pressure and vapor rate during the heat transfer process were measured according to the above test method, and the results are shown in Table 9.

TABLE 8

| Example | 19 | 20 | 21 | 22 | 23 |
|---|---|---|---|---|---|
| cis-1-chloro-3,3,3-trifluoropropene | 60% | 70% | 75% | 85% | 90% |
| cis-1,1,1,4,4,4-hexafluorobutene | 10% | 10% | 10% | 5% | 5% |
| perfluorobutane methyl ether | 30% | 20% | 15% | 10% | 5% |

TABLE 9

| Example | Temperature (° C.) | Pressure (KPa) | Vapor rate (kg/min) | GWP | Boiling point (° C.) | Evaporation heat (kJ/kg) |
|---|---|---|---|---|---|---|
| 19 | 70 | 282 | 0.34 | 97 | 40 | 191 |
| 20 | 70 | 279 | 0.33 | 65 | 39 | 197 |
| 21 | 70 | 279 | 0.33 | 49 | 38 | 200 |
| 22 | 70 | 275 | 0.32 | 33 | 38 | 205 |
| 23 | 70 | 267 | 0.31 | 17 | 38 | 208 |

COMPARATIVE EXAMPLES 1-6

Comparative Examples 1-6 used trans-1-chloro-3,3,3-trifluoropropene, trans-1,3,3,3-tetrafluoropropene, cis-1,3,3,3-tetrafluoropropene, 2,3,3,3-tetrafluoropropene, 1,1-dichloro-1-fluoroethane or perfluoro-n-hexane, respectively as a heat transfer medium. The pressure and vapor rate during the heat transfer process were measured according to the above test method, and the results are shown in Table 10.

TABLE 10

| Comparative example | Temperature (° C.) | Pressure (KPa) | Vapor rate (kg/min) | GWP | Boiling point (° C.) | Evaporation heat (kJ/kg) |
|---|---|---|---|---|---|---|
| 1 | 70 | 510 | 0.35 | 1 | 19 | 195 |
| 2 | 70 | 1620 | 0.46 | <1 | −19 | 195 |
| 3 | 70 | 675 | 0.33 | <1 | 9 | 220 |
| 4 | 70 | 2040 | 0.57 | 4 | −29 | 183 |

TABLE 10-continued

| Comparative example | Temperature (° C.) | Pressure (KPa) | Vapor rate (kg/min) | GWP | Boiling point (° C.) | Evaporation heat (kJ/kg) |
|---|---|---|---|---|---|---|
| 5 | 70 | 325 | 0.29 | 725 | 32 | 223 |
| 6 | 70 | 161 | 0.72 | >5000 | 56 | 88 |

COMPARATIVE EXAMPLES 7-12

Comparative Examples 7-12 used binary mixtures of cis-1-chloro-3,3,3-trifluoropropene and trans-1-chloro-3,3,3-trifluoropropene, cis-1-chloro-3,3,3-trifluoropropene and trans-1,3,3,3-tetrafluoropropene, cis-1-chloro-3,3,3-trifluoropropene and cis-1,3,3,3-tetrafluoropropene, cis-1-chloro-3,3,3-trifluoropropene and 2,3,3,3-tetrafluoropropene, cis-1-chloro-3,3,3-trifluoropropene and 1,1-dichloro-1-fluoroethane, or cis-1-chloro-3,3,3-trifluoropropene and perfluoro-n-hexane as a binary heat transfer medium respectively. The binary mixture has a mass ratio of 1:1. The pressure and vapor rate during the heat transfer process were measured according to the above test method, and the results are shown in Table 11.

TABLE 11

| Comparative example | Temperature (° C.) | Pressure (KPa) | Vapor rate (kg/min) | GWP | Boiling point (° C.) | Evaporation heat (kJ/kg) |
|---|---|---|---|---|---|---|
| 7 | 70 | 396 | 0.33 | <1 | 27 | 202 |
| 8 | 70 | 959 | 0.40 | <1 | −6 | 195 |
| 9 | 70 | 487 | 0.32 | <1 | 20 | 217 |
| 10 | 70 | 1168 | 0.45 | 3 | −16 | 180 |
| 11 | 70 | 305 | 0.30 | 400 | 35 | 220 |
| 12 | 70 | 270 | 0.40 | 3000 | 39 | 167 |

COMPARATIVE EXAMPLES 13-18

Comparative Examples 13-18 used binary mixtures of cis-1,1,1,4,4,4-hexafluorobutene and trans-1-chloro-3,3,3-trifluoropropene, cis-1,1,1,4,4,4-hexafluorobutene and trans-1,3,3,3-tetrafluoropropene, cis-1,1,1,4,4,4-hexafluorobutene and cis-1,3,3,3-tetrafluoropropene, cis-1,1,1,4,4,4-hexafluorobutene and 2,3,3,3-tetrafluoropropene, cis-1,1,1,4,4,4-hexafluorobutene and 1,1-dichloro-1-fluoroethane, or cis-1,1,1,4,4,4-hexafluorobutene and perfluoro-hexane as a binary heat transfer medium respectively. The binary mixture has a mass ratio of 1:1. The pressure and vapor rate during the heat transfer process were measured according to the above test method, and the results are shown in Table 12.

TABLE 12

| Comparative example | Temperature (° C.) | Pressure (KPa) | Vapor rate (kg/min) | GWP | Boiling point (° C.) | Evaporation heat (kJ/kg) |
|---|---|---|---|---|---|---|
| 13 | 70 | 432 | 0.37 | 2 | 24 | 187 |
| 14 | 70 | 1033 | 0.42 | 1 | −7 | 192 |
| 15 | 70 | 533 | 0.35 | 1 | 17 | 205 |
| 16 | 70 | 1248 | 0.48 | 3 | −17 | 178 |
| 17 | 70 | 336 | 0.34 | 360 | 32 | 198 |
| 18 | 70 | 286 | 0.47 | 2500 | 38 | 143 |

COMPARATIVE EXAMPLES 19-24

Comparative Examples 19-24 used binary mixtures of perfluorobutane methyl ether and trans-1-chloro-3,3,3-trifluoropropene, perfluorobutane methyl ether and trans-1,3,3,3-tetrafluoropropene, perfluorobutane methyl ether and cis-1,3,3,3-tetrafluoropropene, perfluorobutane methyl ether and 2,3,3,3-tetrafluoropropene, perfluorobutane methyl ether and 1,1-dichloro-1-fluoroethane, or perfluorobutane methyl ether and perfluoro-n-hexane as a binary heat transfer medium respectively. The binary mixture has a mass ratio of 1:1. The pressure and vapor rate during the heat transfer process were measured according to the above test method, and the results are shown in Table 13.

TABLE 13

| Comparative example | Temperature (° C.) | Pressure (KPa) | Vapor rate (kg/min) | GWP | Boiling point (° C.) | Evaporation heat (kJ/kg) |
|---|---|---|---|---|---|---|
| 19 | 70 | 381 | 0.38 | 160 | 27 | 182 |
| 20 | 70 | 1066 | 0.45 | 160 | −10 | 192 |
| 21 | 70 | 503 | 0.35 | 160 | 17 | 205 |
| 22 | 70 | 1306 | 0.51 | 162 | −20 | 179 |
| 23 | 70 | 277 | 0.34 | 470 | 37 | 194 |
| 24 | 70 | 152 | 0.61 | 2600 | 58 | 101 |

In practical application, one prefers the lowest operating pressure and the lowest vapor rate to remove the same amounts of heat. In table 1, cis-1-chloro-3,3,3-trifluoropropene gave the best combination of relatively low operating pressure, low vapor rate and low GWP. Compared with those compounds in table 10, the three kinds of heat transfer medium disclosed in present invention in table 1 have good comprehensive performances. The binary and ternary mixtures of cis-1-chloro-3,3,3-trifluoropropene, cis-1,1,1,4,4,4-hexafluorobutene and perfluorobutane methyl ether have better heat transfer performances than those of single heat transfer medium. Mixing the three kinds of disclosed heat transfer fluids in this invention with those compounds in comparative examples 1-6, the mixture heat transfer performances cannot be improved. It can be seen that the mixed heat transfer mediums obtained by mixing the three compounds provided by the present invention has better heat transfer performance The applicant claims that the detailed structural features of the present invention are described by the above-described examples, but the present invention is not limited to the above detailed structural features, that is, the present invention is not necessarily limited to the above detailed structural features.

The preferred embodiments of the present invention have been described in detail above, but the present invention is not limited to the specific details in the above embodiments. It should be further noted that the specific technical features described in the above specific embodiments may be combined in any suitable manner without contradiction. To avoid unnecessary repetition, the present invention will not describe the every possible combination separately.

The invention claimed is:

1. An anhydrous heat transfer medium capable of working in a heat transfer process without need of applying any external work, the anhydrous heat transfer medium has: an ozone depletion potential of less than 0.01; and a global warming potential of less than 500; wherein the anhydrous heat transfer medium comprises perfluorobutane methyl ether, and at least one of cis-1-chloro-3,3,3-trifluoropropene and cis-1,1,1,4,4,4-hexafluorobutene.

2. The anhydrous heat transfer medium according to claim 1, wherein the composition of the anhydrous heat transfer medium comprises cis-1-chloro-3,3,3-trifluoropropene and perfluorobutane methyl ether.

3. The anhydrous heat transfer medium according to claim 2, wherein cis-1-chloro-3,3,3-trifluoropropene has a mass fraction of 1 to 99%.

4. The anhydrous heat transfer medium according to claim 2, wherein cis-1-chloro-3,3,3-trifluoropropene has a mass fraction of 50 to 70%.

5. The anhydrous heat transfer medium according to claim 2, wherein perfluorobutane methyl ether has a mass fraction of 10 to 90%.

6. The anhydrous heat transfer medium according to claim 2, wherein perfluorobutane methyl ether has a mass fraction of 30 to 50%.

7. The anhydrous heat transfer medium according to claim 1, wherein the composition of the anhydrous heat transfer medium comprises cis-1-chloro-3,3,3-trifluoropropene, cis-1,1,1,4,4,4-hexafluorobutene and perfluorobutane methyl ether.

8. The anhydrous heat transfer medium according to claim 7, wherein cis-1-chloro-3,3,3-trifluoropropene has a mass fraction of 60 to 90%.

9. The anhydrous heat transfer medium according to claim 7, wherein the mass fraction of the cis-1,1,1,4,4,4-hexafluorobutene is 5-10%.

10. The heat transfer medium according to claim 7, wherein perfluorobutane methyl ether has a mass fraction of 5 to 30%.

11. The heat transfer medium according to claim 1, wherein the composition of the heat transfer medium comprises perfluorobutane methyl ether and cis-1,1,1,4,4,4-hexafluorobutene.

12. The heat transfer medium according to claim 11, wherein perfluorobutane methyl ether has a mass fraction of 10 to 90%.

13. The heat transfer medium according to claim 11, wherein cis-1,1,1,4,4,4-hexafluorobutene has a mass fraction of 10 to 90%.

14. The heat transfer medium of claim 1, wherein the heat transfer medium is adapted for use in large-scale integrated circuit boards, large computer systems, electric vehicles, high speed trains, satellites or space stations.

* * * * *